(12) United States Patent
Roestenburg et al.

(10) Patent No.: US 7,249,197 B1
(45) Date of Patent: Jul. 24, 2007

(54) SYSTEM, APPARATUS AND METHOD FOR PERSONALISING WEB CONTENT

(75) Inventors: Adnanus Henricus Nicolaas Roestenburg, Harlow (GB); Clive C Hayball, Herts (GB); Philip V Davies, Chelmsford (GB); Ross M MacGillivray, Kanata (CA); Nigel L Bragg, Weston Colville (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 834 days.

(21) Appl. No.: 09/693,132

(22) Filed: Oct. 20, 2000

(51) Int. Cl.
*G06F 15/16* (2006.01)

(52) U.S. Cl. ...................... 709/246; 709/217

(58) Field of Classification Search ........ 709/223–226, 709/232, 246
See application file for complete search history.

(56) References Cited

U.S. PATENT DOCUMENTS

| | | | | |
|---|---|---|---|---|
| 5,894,554 A * | 4/1999 | Lowery et al. | ............. | 709/203 |
| 6,003,076 A * | 12/1999 | Maruyama et al. | ......... | 709/223 |
| 6,038,601 A * | 3/2000 | Lambert et al. | ............ | 709/226 |
| 6,049,821 A * | 4/2000 | Theriault et al. | ........... | 709/203 |
| 6,094,677 A * | 7/2000 | Capek et al. | ................ | 709/219 |
| 6,128,663 A * | 10/2000 | Thomas | ...................... | 709/228 |
| 6,138,142 A * | 10/2000 | Linsk | .......................... | 709/203 |
| 6,286,043 B1 * | 9/2001 | Cuomo et al. | .............. | 709/223 |
| 6,330,561 B1 * | 12/2001 | Cohen et al. | ................. | 707/10 |
| 6,345,292 B1 * | 2/2002 | Daugherty et al. | ......... | 709/214 |
| 6,421,733 B1 * | 7/2002 | Tso et al. | .................... | 709/246 |
| 6,477,575 B1 * | 11/2002 | Koeppel et al. | ............ | 709/224 |
| 6,622,174 B1 * | 9/2003 | Ukita et al. | ................. | 709/246 |
| 6,704,776 B1 * | 3/2004 | Fortune | ...................... | 709/219 |
| 6,725,265 B1 * | 4/2004 | Challenger et al. | ......... | 709/226 |
| 6,751,608 B1 * | 6/2004 | Cohen et al. | ................. | 707/3 |
| 6,766,362 B1 * | 7/2004 | Miyasaka et al. | ........... | 709/219 |
| 6,829,654 B1 * | 12/2004 | Jungck | ........................ | 709/246 |
| 6,892,219 B1 * | 5/2005 | Lerenc et al. | ............... | 709/203 |
| 6,944,677 B1 * | 9/2005 | Zhao | ........................... | 709/244 |
| 7,076,534 B1 * | 7/2006 | Cleron et al. | ............... | 709/219 |

* cited by examiner

*Primary Examiner*—Jason Cardone
*Assistant Examiner*—Thomas Duong
(74) *Attorney, Agent, or Firm*—Barnes & Thornburg, LLP

(57) ABSTRACT

Previous systems and methods for personalizing web content presented to a user has been achieved in a decentralized manner by storing personal data relating to the user repeatedly by different content providing servers. Consequently, the consistency of the data stored can be inconsistent and, in some cases, incomplete. Additionally, the user does not have any control over the dissemination of the content. The present invention provides a system, apparatus and method whereby web related data is modified in communications between user equipment units and content providing servers. The modification to the web related data is carried out by a proxy server (20) having access to centrally stored personal data in a data store (22). Consequently, data provided to content providing servers is consistent, complete and the information provided by the content providing servers to the user has a higher degree of relevance to the user.

35 Claims, 11 Drawing Sheets

SYSTEM, APPARATUS AND METHOD FOR PERSONALISING WEB CONTENT

The present invention relates to a system, apparatus and method for personalising web content of the type delivered from a content providing server, for example a web server, to a client equipment unit, for example a personal computer, over a communication network, for example, a core network.

BACKGROUND TO THE INVENTION

Using the Internet, it is known for a user of a personal computer to download web content, for example a web page from a web server. Personalisation of the web content is increasingly being required. Personalisation of web content enables providers of the web content to tailor the web content to preferences of the user as well as personal circumstances of the user. It is envisaged that personalisation of the web content will add value to services provided over the Internet, especially e-commerce. Of course, personalisation of the web content can only be achieved with information about the user. Furthermore, the web content is, of course, provided by different respective content providers.

A number of approaches exist to personalising the web content. Consequently, each of the content providers can typically employ different approaches having different strategies and using different software tools for personalising the web content. Additionally, the content providers can repeatedly request information about the user, resulting in inconsistent information about the user being stored by the content providers. In some cases, the content providers do not possess a sufficient amount of information about the user, resulting in further scope existing to better personalise the web content and hence to deliver the web content in a form that is more in accordance with needs and/or personal circumstances of the user.

Mechanisms, for example Cookies, provided by web browser software (hereinafter referred to as a "web browser") have been known to be used to personalise the web content to a limited extent. Cookies are small pieces of information sent by the web server to the web browser, for example, to track origins of requests for web content. However, Cookies only permit, a limited amount of data to be stored locally by the web browser. Also, Cookies are not secure and many users distrust and/or refuse to accept Cookies.

Additionally, in the cases of a number of known approaches to personalising the web content, once submitted, the user has little or no control over the information. Therefore, a risk exists that any of the information about the user submitted to content providers can be disseminated without of the user knowing of such dissemination.

STATEMENT OF INVENTION

According to a first aspect of the present invention, there is provided a web content personalisation system for a communications network comprising: a client equipment unit capable of communicating with a content providing server for providing web content; a data manipulation server for disposing in-line between the client equipment unit and the content providing server, the data manipulation server being coupled to a data store arranged to store data relating to a user of the client equipment unit; wherein the data manipulation server is adapted to modify web-related data communicated between the client equipment unit and the content providing server using a predetermined amount of the data relating to the user in response to a request for obtaining the web content being transmitted from the client equipment unit.

At least in relation to the present invention, the term "web-related data" is intended to include information communicated in relation to communication of web content and should include the web content itself and/or data relating to protocols used to communicate the web content. It should be appreciated that the definition of the term "web content" is not limited to any language in which the web content is written, nor is the definition limited to any particular protocol used in the communication of the web content.

The predetermined amount of the data relating to the user may be any suitable amount of the data relating to the user depending upon the purpose for communicating the web content. The predetermined amount of data relating to the user can be determined by the client equipment unit, the content providing server, or the data manipulation server.

The web related data may be data relating to a protocol. Preferably, the protocol is a Hyper Text Transfer Protocol (HTTP).

Alternatively, or additionally, the web related data may be the web content. Preferably, the web content is Hyper Text Mark-up Language (HTML) data.

Preferably, the data relating to the user is static data. Preferably, the static data may be obtained from the user. Alternatively, or additionally, the static data may be obtained from a content provider associated with the web content. Static data is data that does not change regularly over a number of sessions.

Preferably, the data relating to the user is dynamic data. More preferably, the dynamic data is obtained from an access provider associated with supporting communications between the client equipment unit and the content providing server. Dynamic data is data that typically changes more often than static data, especially on a per session basis.

Preferably, the data manipulation server is a proxy server.

According to a second aspect of the present invention, there is provided a data manipulation server apparatus for coupling in-line between a client equipment unit and a content providing server, the apparatus comprising: a data manipulation engine arranged to intercept a communication between the client equipment unit and the content providing server, the data manipulation engine being coupled to a data store arranged to store data relating to a user of the client equipment unit; wherein the data manipulation engine is arranged to modify web-related data contained in the communication using a predetermined amount of the data relating to the user in response to a request for obtaining web content being transmitted from the client equipment unit.

The web related data may be data relating to a protocol. Preferably, the protocol is a Hyper Text Transfer Protocol (HTTP).

Alternatively, or additionally, the web related data may be the web content. Preferably, the web content is Hyper Text Mark-up Language (HTML) data.

Preferably, the data relating to the user is static data. The static data may be obtained from the user. Alternatively or additionally, the static data may be obtained from a content provider associated with the web content.

Preferably, the data relating to the user is dynamic data. More preferably, the dynamic data is obtained from an access provider associated with supporting communications between the client equipment unit and the content providing server.

Preferably, the data manipulation server is a proxy server.

According to a third aspect of the present invention, there is provided a content providing server apparatus comprising: a transceiver and a processor coupled to a data store arranged to store web content, the transceiver and the processor being arranged to retrieve web-related data from the data store and transmit the web-related data to a user equipment unit in response to a request from the user equipment unit for the web content; wherein the web-related data comprises an attribute corresponding to data relating to a user of the user equipment unit for replacement by a data manipulation server using the data relating to the user. The web related data may be data relating to a protocol. Preferably, the protocol is a Hyper Text Transfer Protocol (HTTP).

Alternatively, or additionally, the web related data may be the web content. Preferably, the web content is Hyper Text Mark-up Language (HTML) data.

Preferably, the data relating to the user is static data. The static data may be obtained from the user. Alternatively, or additionally, the static data may be obtained from a content provider associated with the web content.

Preferably, the data relating to the user is dynamic data. More preferably the dynamic data is obtained from an access provider associated with supporting communications between the client equipment unit and the content providing server.

Preferably, the data manipulation server is a proxy server.

According to a fourth aspect of the present invention, there is provided a content providing server apparatus comprising: a transceiver and a processor coupled to a data store arranged to store web content, the transceiver and the processor being arranged to retrieve web-related data from the data store and transmit the web-related data to a user equipment unit in response to a request from the user equipment unit for the web content; wherein the request comprises web-related data corresponding to data relating to a user of the user equipment unit; the data store also comprises at least one version of the web content, the at least one version of the web content corresponding to possible content preferences of the user; the transceiver and processor are arranged to retrieve and transmit the at least one version of the web content corresponding to at least a portion of the data relating to the user in response to the request.

The web related data may be data relating to a protocol. Preferably, the protocol is a Hyper Text Transfer Protocol (HTTP).

Alternatively, or additionally, the web related data may be the web content. Preferably, the web content is Hyper Text Mark-up Language (HTML) data.

Preferably, the data relating to the user is static data. The static data may be obtained from the user. Alternatively or additionally the static data is obtained from a content provider associated with the web content.

Preferably, the data relating to the user is dynamic data. More preferably, the dynamic data is obtained from an access provider associated with supporting communications between the client equipment unit and the content providing server.

Preferably, the data manipulation server is a proxy server.

According to a fifth aspect of the present invention, there is provided web-related data comprising an attribute corresponding to data relating to a user of the user equipment unit for replacement by a data manipulation server using the data relating to the user.

Preferably, the web-related data is protocol data. More preferably, the protocol data is Hyper Text Transfer Protocol (HTTP) data.

Preferably, the web-related data is web content data. More preferably, the web content data is Hyper Text Mark-up Language (HTML) data.

Preferably, the data relating to the user is static data. The static data may be obtained from the user. Alternatively, or additionally, the static data may be obtained from a content provider associated with the web content.

Preferably the data relating to the user is dynamic data. More preferably, the dynamic data is obtained from an access provider associated with supporting communications between the client equipment unit and the content providing server.

According to a sixth aspect of the invention, there is provided a method of personalising web content communicated between a user equipment unit and a content providing server, the method comprising the steps of: intercepting web-related data communicated between the user equipment unit and the content providing server; retrieving a predetermined amount of data relating to a user of the user equipment unit; modifying the web-related data communicated between the client equipment unit and the content providing server using the predetermined amount of the data relating to the user in response to a request for obtaining the web content being transmitted from the client equipment unit.

Preferably, the web related data is data relating to a protocol. More preferably, the protocol is a Hyper Text Transfer Protocol (HTTP).

Preferably, the web related data is the web content. More preferably, the web content is Hyper Text Mark-up Language (HTML) data.

The data relating to the user may be static data. Preferably, the method further comprises the step of: obtaining the static data from the user. More preferably, the method further comprises the step of: obtaining the static data from a content provider associated with the web content.

The data relating to the user may be dynamic data. Preferably, the method further comprises the step of: obtaining the dynamic data from an access provider associated with supporting communications between the client equipment unit and the content providing server.

According to a seventh aspect of the present invention, there is provided computer executable software code stored on a computer readable medium, the code being for personalising web content communicated between a user equipment unit and a content providing server, the code comprising: code to intercept web-related data communicated between the user equipment unit and the content providing server; code to retrieve a predetermined amount of data relating to a user of the user equipment unit; code to modify the web-related data communicated between the client equipment unit and the content providing server using the predetermined amount of the data relating to the user in response to a request for obtaining the web content being transmitted from the client equipment unit.

According to an eighth aspect of the present invention, there is provided a programmed computer for personalising web content communicated between a user equipment unit and a content providing server, the computer comprising: a memory having at least one region for storing computer executable program code, and a processor for executing the program code stored in the memory, wherein the program code comprises: code to intercept web-related data communicated between the user equipment unit and the content providing server; code to retrieve a predetermined amount of data relating to a user of the user equipment unit; code to modify the web-related data communicated between the client equipment unit and the content providing server using the predetermined amount of the data relating to the user in response to a request for obtaining the web content being transmitted from the client equipment unit.

According to a ninth aspect of the present invention, there is provided a computer readable medium having computer executable code stored thereon, the code being for personalising web content communicated between a user equipment unit and a content providing server, the code comprising: code to intercept web-related data communicated between the user equipment unit and the content providing server; code to retrieve a predetermined amount of data relating to a user of the user equipment unit; code to modify the web-related data communicated between the client equipment unit and the content providing server using the predetermined amount of the data relating to the user in response to a request for obtaining the web content being transmitted from the client equipment unit.

In relation to the aspects of the invention set forth above, the personalisation of the web content may be contingent upon a respective suitable subscription being held by the user equipment unit and/or the content providing server.

It is thus possible to provide a system, apparatus, method and computer program product enabling content providers to reduce amounts of storage resources used for user data. The provision of a centralised repository for the information about the user also results in reduced maintenance, and in some cases no maintenance, of the information by the content providers. Additionally, the user is relieved of the burden of continuously providing personal data to each new content provider encountered with which the user wants to interact. As information about the user changes, the user can update the information about the user centrally, thereby obviating the need to update the various, and usually numerous, content providers as to any changes. Additionally, the user is able to control dissemination of personal data so that the information about the user is not provided without instructions to do so from the user. Furthermore, the user is provided with a facility to selectively control types and quantities of information about the user that is disclosed to content providers. The invention also allows certain types of information, for example, access speed and/or location of the user to be used by the content providers to personalise the web content, whereas previously the above described types of information have not been available to the content providers.

DESCRIPTION OF THE DRAWINGS

At least one embodiment of the invention will now be described, by way of example only, with reference to the accompanying drawings, in which.

PREFERRED EMBODIMENT(S) OF THE INVENTION

Figure 1:
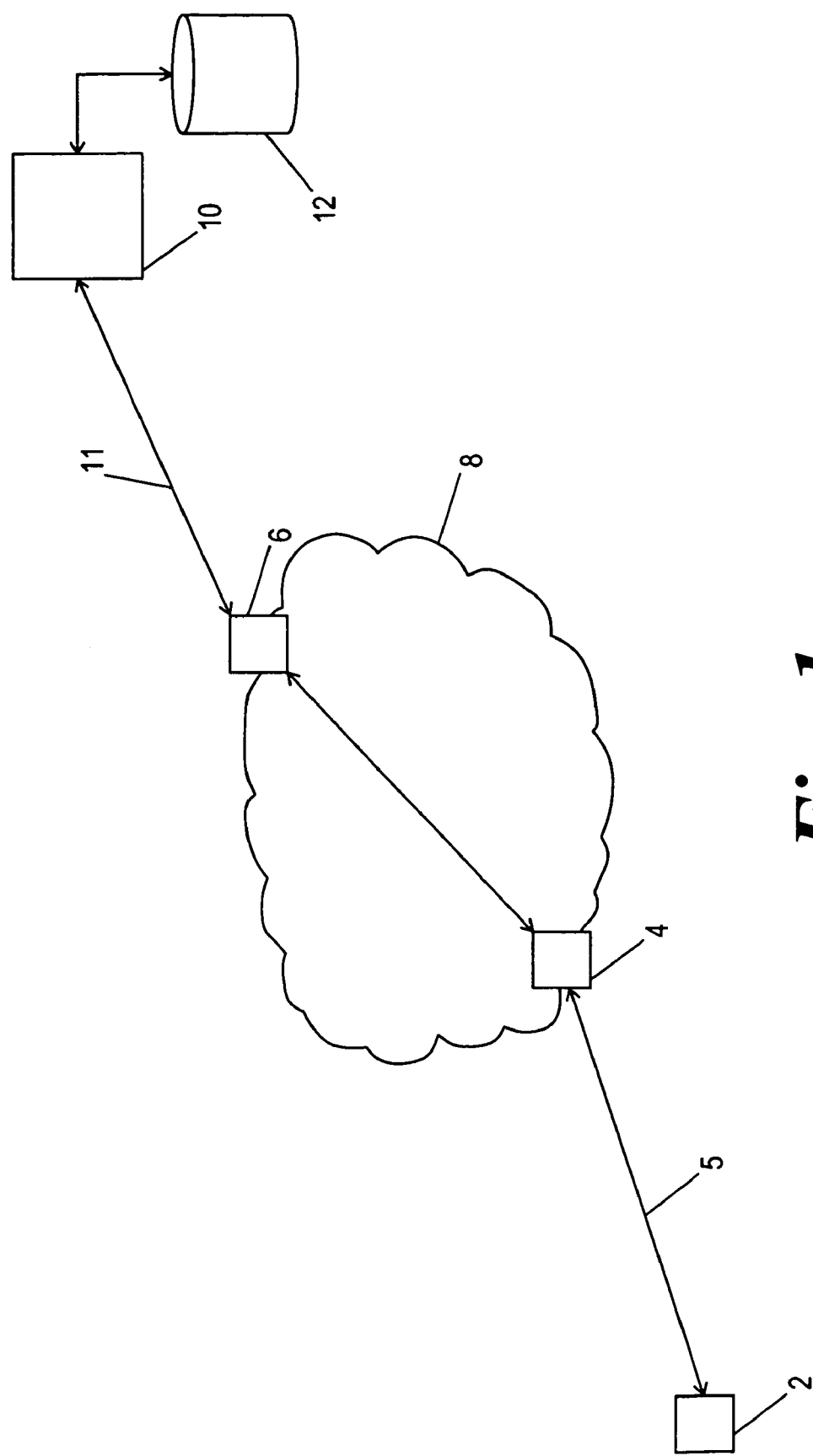
FIG. 1 is a schematic diagram of a communications link for providing web content to a client equipment unit.

Throughout the description identical reference numerals will be used to identify like parts.

Referring to FIG. 1, a client equipment unit, for example, a Personal Computer (PC) 2 is capable of communicating with equipment 4 of a service provider, for example an Internet Service Provider (ISP), via a first communications link 5, the ISP server 4 being provided by an ISP. The PC 2 is capable of running a web browser software package 60, for example, Netscape® Communicator v. 4.75 (hereinafter referred to as the "web browser") (FIGS. 8 to 11). A window 61 of the web browser 60 comprises an address bar 62 and a space 64 for inputting web-related data, for example, a Uniform Resource Location (URL). The ISP server 4 is capable of communicating with a network node 6 via a routed network 8, the network node 6 being capable of communicating with a content providing server, for example, a web server 10 via a third communication link 11. The web server 10 is coupled to a first storage device 12 containing web pages. Although, in this example, the content providing server is the web server 10, for providing the web pages, it should be appreciated that the web server 10 or other types of servers can be used to provide content other than the web pages, for example, video data files, such as Motion Picture Expert Group (MPEG) files.

Figure 2:
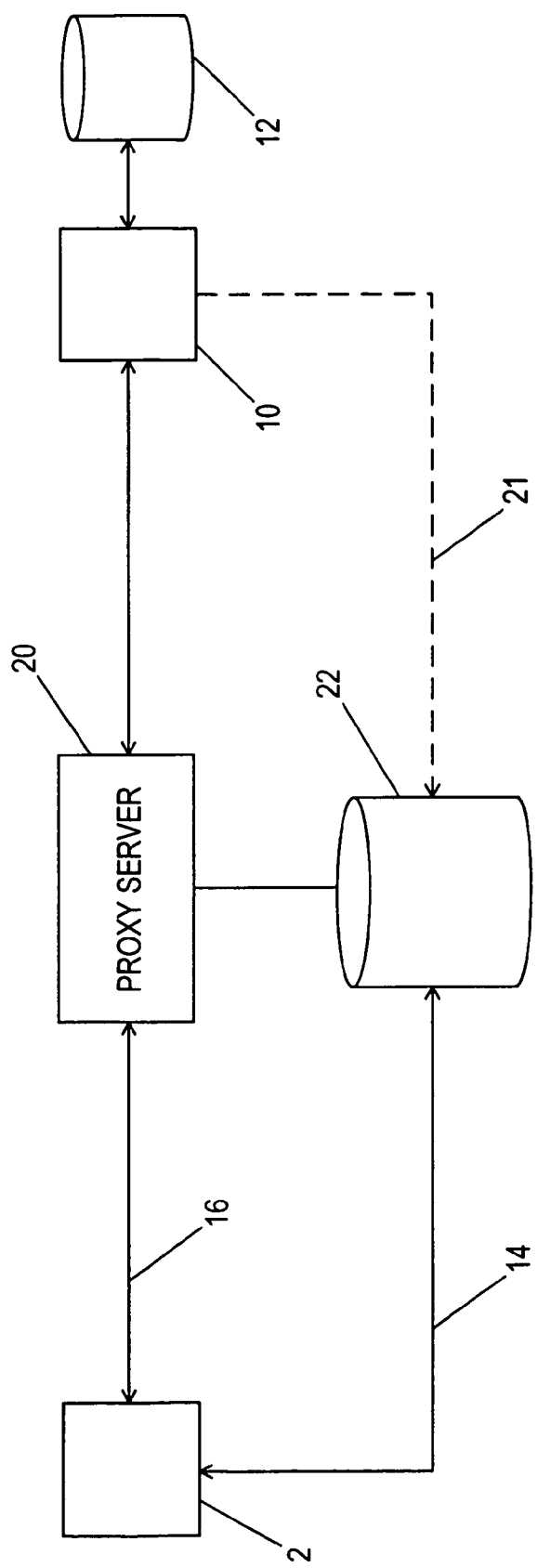
FIG. 2 is a schematic diagram of a system for supporting embodiments of the present invention.

In this example (FIG. 2), the equipment 4 comprises a proxy server 20 coupled to a second storage device 22, for example, a disk drive acting as a cache. The proxy server 20 is capable of communicating with the PC 2. The PC 2 is also capable of accessing the second storage device 22 either directly 14, or indirectly 16 via the proxy server 20. In this example, the proxy server 20 is an Apache server capable of communicating with the web server 10, although other types of server can be used.

The second storage device 22 is capable of storing information, for example, corresponding to static attributes relating to a user of the PC 2, for example: Common name, Surname, User password, Business telephone number, A distinguished name reference, Description, Title, X121 Address, Address for received registered documents or telegrams, For telegram service, Preferred Delivery method, Telex number, Teletex terminal identifier, ISDN number, Business fax number, Street address, Post Office Box, Business postal code, Business postal address, Name of office for physical delivery, Organization Unit, State or province (organization), Locality name (organization), Audio data, Business category, Car license, Display name, Department number, Employee number, Employee type, Given name, Home telephone, Home postal address, Initials of user, Web site, Email address, Distinguished name of manager, Mobile number, Organization, Pager, Photo, Room number, Distinguished name of secretary, User ID, User certificate, X500 unique identifier, Preferred language, User S/MIME Certificate, User PKCS #12, Billing address, Country code, Credit card number, Credit card expiry, Special condition/disability, Country of Birth, Preferred currency, Department name, Date of Birth, Employer name, Ethnics origin, Gender, Level of graphics detail, Hobby, Home country code (domicile), Home facsimile number, Home locality, Home e-mail address, Home mobile, Home pager, Home state or province, Home URI, Preferred language, Marital Status, Nationality, Number of Children, Personal title e.g. Ms, Mr, etc., OS platform, Residential status, Shipping address, and/or Subscribed topics; and/or dynamic attributes relating to the user of the PC 2, for example: IP address, Terminal type, Connection type, Connection bandwidth and/or Location details.

The attributes are pieces of personal information relating to the user of the PC 2, for example, information relating to preferences of the user or personal circumstances of the user. Each of the attributes can be inserted into web-related data in the form of a parameter/variable. Examples of variables/parameters representing attributes such as domicile of and language spoken by the user, are: CDC_DOMICILE or CDC_LANGUAGE. Variables/parameters respectively corresponding to the attributes can also be inserted in web-related data in a function, for example, a protocol command or web content. An example of the function is a function to calculate a position of the user, or a function to convert currencies. Alternatively, or additionally, the function can be inserted into the web-related data without any variables/parameters. The information stored by the second storage device 22 corresponding to the attributes can be made available to, or used by, the content provider upon subscription. Furthermore, the above attributes can be grouped into a number of sets of attributes that can overlap.

In order to further illustrate the embodiments of the present invention, the operation of the system and apparatus will be described in the context of a request to download a web page from a web site of a fictitious company named "Global Car Hire Corporation" (GCHC). The web site of GCHC comprises, in this example, a home page, a number of versions of a template web page in different languages, for example, English and Dutch, and a generic web page comprising occurrences' of attribute variables/parameters and/or functions relating to attributes for substitution by or use with the personal information relating to the user. As with the number of versions of the template web page, the web site can comprise a number of versions of the generic web page.

Figure 3:
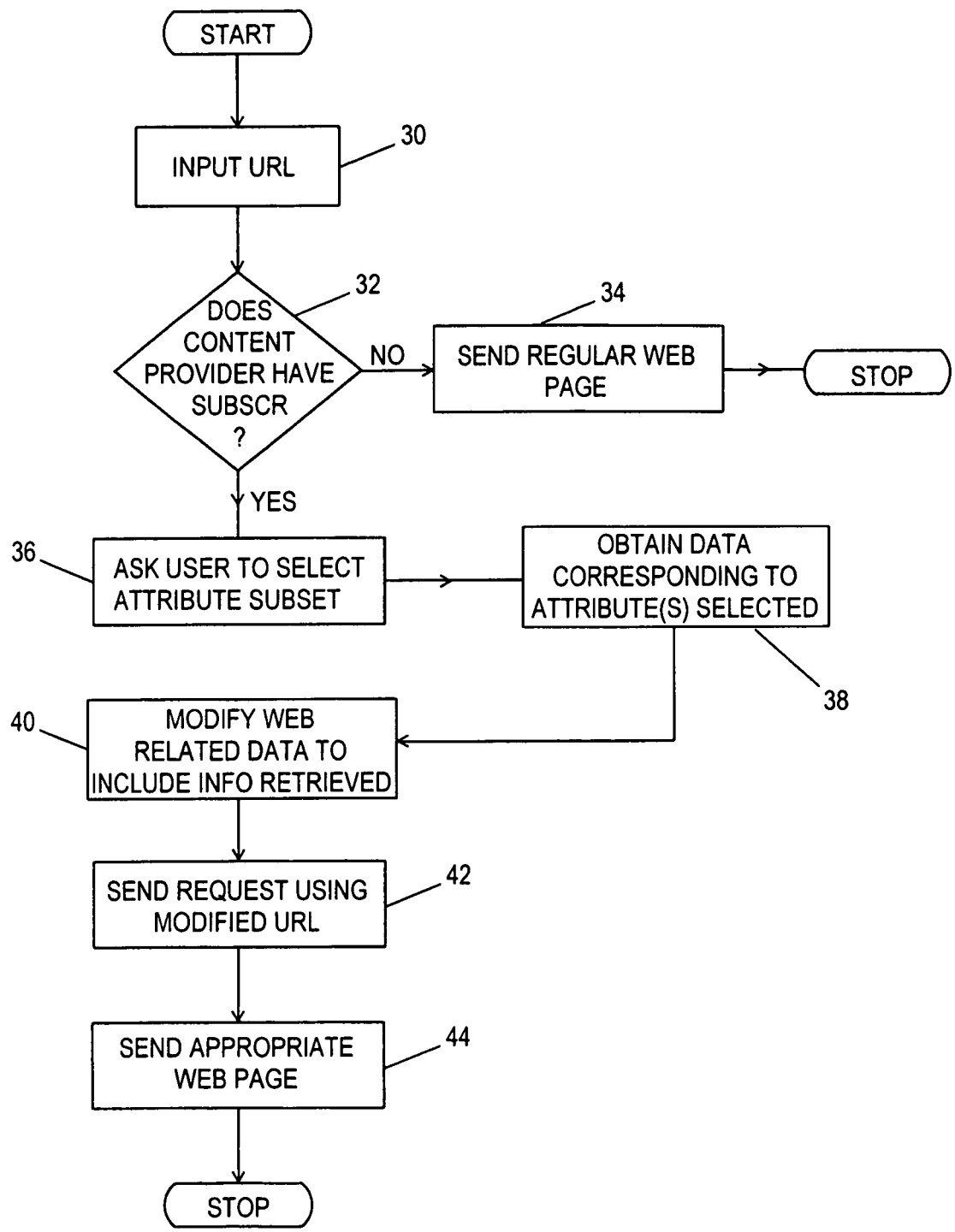
FIG. 3 is a flow diagram of a method constituting a first embodiment of the present invention.

In operation (FIG. 3), the user is identified to the equipment 4 in accordance with any suitable technique known in the art, for example, using a dial-up connection such as supported by Microsoft® Windows 2000, an Asynchronous Digital Subscriber Line (ADSL) connection or a wireless connection. The user then inputs (step 30) a URL corresponding to the web page of GCHC, sometimes known as a web address, in the space 64 provided in the address bar 62 of the web browser 60.

In this example, the web browser 60 then sends the request for the web page to the web server 10 supporting the web site of GCHC. Since the request for the web page has to pass through the ISP server 4, and hence the proxy server 20, the request is intercepted by the proxy server 20. The proxy server 20 determines (step 32) whether the content provider corresponding to the URL, in this case GCHC, has a subscription with, in this example, the ISP for the provision of personal information relating to the user. If the content provider does not possess the subscription to the ISP for the provision of the personal information relating to the user, the proxy server 20 forwards the request for the web page to the web server 10 substantially as received. The web server 10 then provides (step 34) a default web page (FIG. 8) of the web site. Hence, the web page (the home page, in this example) provided by the web server 10 does not take into account any personal information about the user that exists.

If, however, GCHC possesses the subscription with the ISP for the provision of personal information about the user, the proxy server 20 requests (step 36) the user to select one of the sets of attributes that can be used by the web server 10 in order to deliver the web page in a personalised form. Of course, if required, more than one of the sets of attributes can be selected by the user. Once the proxy server 20 has received a reply to the request for the selection of the one of the sets of attributes, the proxy server 20 retrieves (step 38) personal data about the user, corresponding to the one of the sets of attributes selected, from the second storage device 22 and modifies (step 40) web-related data, in this example, a command submitted by the PC 2 to obtain a personalised web page corresponding to the modified web related data, such as a modified URL. In this example, the web browser 60 is operating in accordance with a Hyper Text Transfer Protocol (HTTP). Consequently, an HTTP GET command is modified (step 40) from, for example, http://www.gchire.com to http://www.gchire.com?language=Dutch by the proxy server 20, if a preferred language of the user obtained from the second storage device 22 is the Dutch language and the selected one of the sets of attributes only contains the preferred language attribute. The modified URL is then sent (step 42) by the proxy server 20 to the web server 10; The web server 10 then analyses the command, for example using a Common Gateway Interface (CGI) script, in order to retrieve an appropriate version of the web page requested, i.e. one of the number of versions of the template web page, the appropriate version of the web page requested having content of greater relevance to the user than the basic unpersonalised home page of the web site of GCHC. The appropriate version of the web page is then transmitted (step 44) to the PC 2 for presentation to the user by the web browser 60.

In another example, the HTTP GET command is modified to take into account the one of the sets of attributes comprising two (or more) attributes, for example the preferred language and location of the user. The personal information stored in the second storage device 22 corresponding to the attributes of domicile and preferred language is retrieved (step 38) and appended to the HTTP GET command. Consequently, if the user is domiciled in, for example, the United Kingdom (UK) and prefers speaking the English language, the HTTP GET command is modified (step 40) by the proxy server 20 from http://www.gchire.com to http://www.gchire.com?domicile =UK & lanquaqe=English. The HTTP GET command is then sent (step 42) by the proxy server 20 to the web server 10. The appropriate version of the web page (FIG. 9) is subsequently sent (step 44) by the web server 10 to the PC 2, and contains information in the English language about car hire in the UK.

In another example, if the user is domiciled in the UK, but prefers speaking Dutch language, the appropriate version of the web page (FIG. 10) sent (step 44) by the web server 10 contains information in the Dutch language about car hire in the UK.

Figure 4:
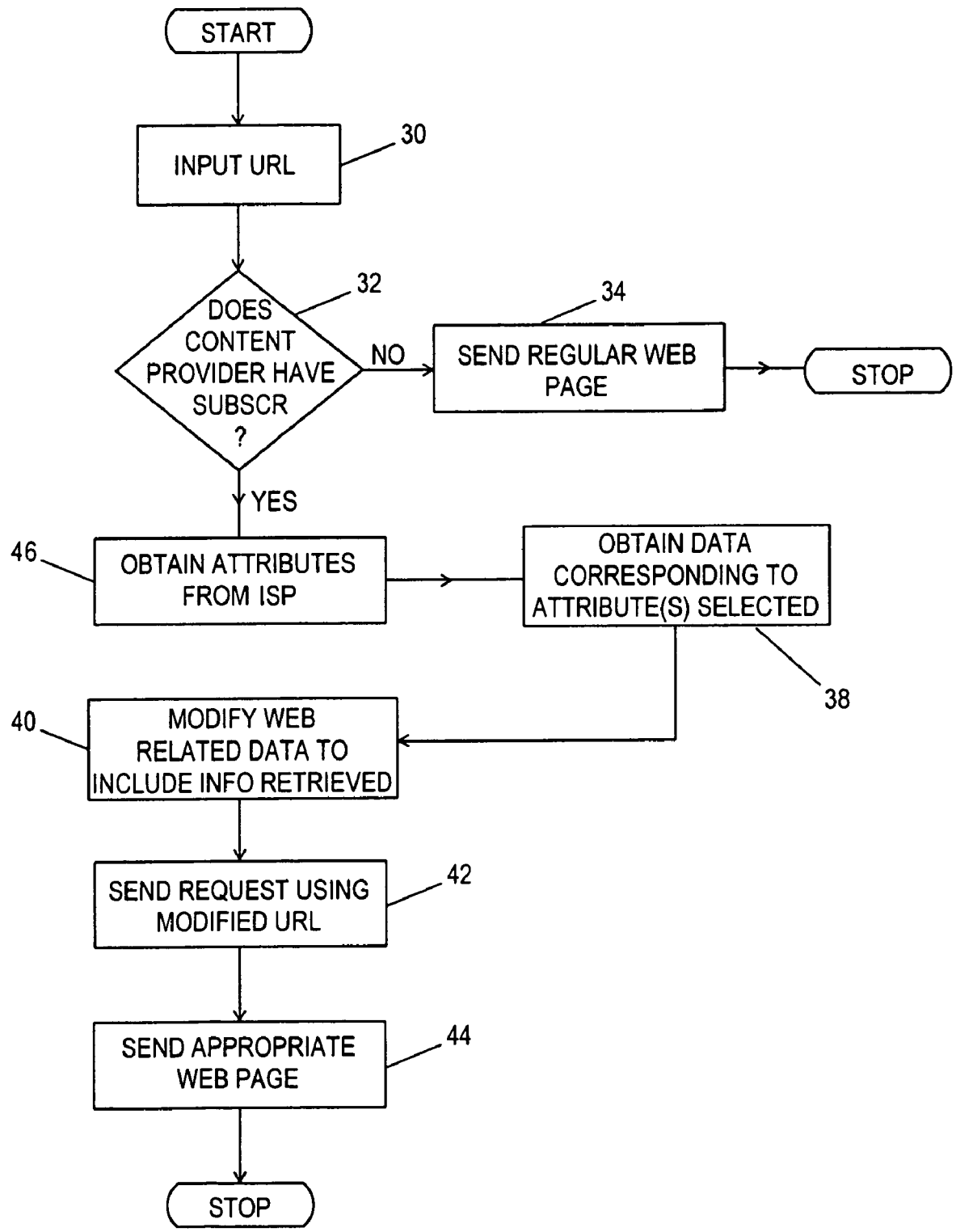
FIG. 4 is a flow diagram of another method constituting a second embodiment of the present invention.

In another embodiment of the invention (FIG. 4), the user predefines a rule set comprising at least one rule, which applies to a particular content provider or group of content providers. The rule set specifies attributes that the user is willing to disclose to the particular content provider, for example GCHC, or group of content providers. The user submits (step 30) the URL through the HTTP GET command to the web server 10 in a same way as already described above. The HTTP GET command is intercepted by the proxy server 20. The proxy server 20 then determines (step 32) whether GCHC (the content provider) possesses the subscription to the ISP for the provision of personal data. As previously described, if GCHC has not subscribed to the ISP for the provision of personal data, the proxy server 20 forwards (step 34) the HTTP GET command intercepted to the web server 10 substantially as received. The web server 10 then provides (step 34) the home page of the web site. Hence, the web page provided by the web server 10 does not take into account any personal information about the user that exists.

If, however, the GCHC possesses the subscription to the ISP for the provision of personal data, the ISP automatically selects the one of the sets of attributes that can be used by the web server 10 in accordance with the rule set provided by the user to the proxy server 20. Of course, if required, more than one of the sets of attributes can be selected by the ISP. In the same manner as already described above, the proxy server 20 retrieves (step 38) personal data from the second storage device 22 corresponding to the one of the set of attributes selected and modifies the HTTP GET command (step 40) as already described above in relation to the first embodiment of the invention. The modified HTTP GET command is then forwarded (step 42) to the web server 10. As previously described, the web server 10 then processes the HTTP GET command and transmits (step 44) the appropriate version of the web page to the PC 2 for presentation to the user by the web browser 60.

Although the above examples have been described in relation to the HTTP GET command, it should be appreciated that other mechanisms in the HTTP can be employed to convey personal data relating to the user to the web server 10 for example, an HTTP POST command having a message body that can be modified to carry the personal data.

Figure 5:
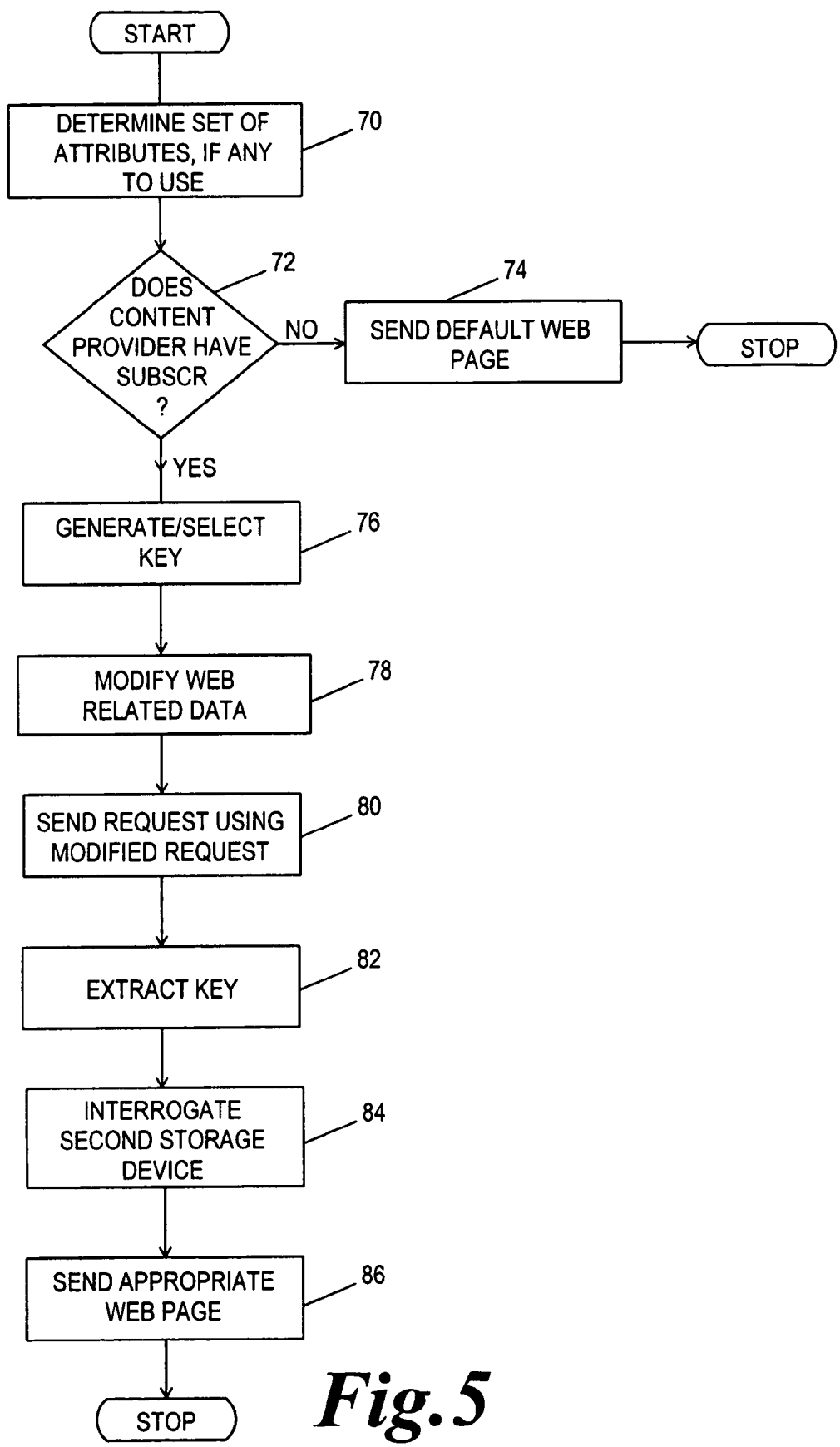
FIG. 5 is a flow diagram of a further method constituting a third embodiment of the present invention.

In a third embodiment of the invention (FIG. 5), the one of the sets of attributes is selected (step 70) in accordance with any one of the methods of selection described above in relation to the first and/or second embodiments of the invention. Upon interception of the web-related data, in this example the HTTP GET command, the proxy server 20 then determines (step 72) whether the content provider, in this example GCHC, possesses the subscription with the ISP for the provision of personal information about the user. If GCHC does not possess the subscription with the ISP for the provision of personal information about the user, the web server 10 is unable to obtain the personal information from the second storage device 22 and the default web page is sent (step 74) to the PC 2 for presentation to the user by the web browser 60. If GCHC possesses the subscription with the ISP for the provision of personal information about the user, the one of the (or more) sets of attributes selected is encoded (step 76), for example in a form of a key, by the proxy server 20. The HTTP GET command intercepted by the proxy server 20 is then modified (step 78), for example from http://www.gchire.com to http://www.chire.com?kev=12539, where 12539 is a key corresponding to the one of the sets of attributes selected. The modified HTTP GET command is then sent (step 80) to the web server 10. The web server 10 extracts (step 82) the key from the HTTP GET command and contacts the second storage device 22 using, for example a remote database/directory access protocol 21 (FIG. 2), such as a Lightweight Directory Access Protocol (LDAP), in order to obtain the personal information corresponding to the one of the sets of attributes to which the key relates. Upon obtaining the personal information from the second storage device 22, the web server 10 sends (step 86) the personalised web page corresponding to the personal information obtained to the PC 2 for presentation to the user by the web browser 60.

Since the HTTP GET command is limited to a length of 256 characters (including the URL), more space for communicating attributes is advantageously made available in this embodiment.

Figure 6:
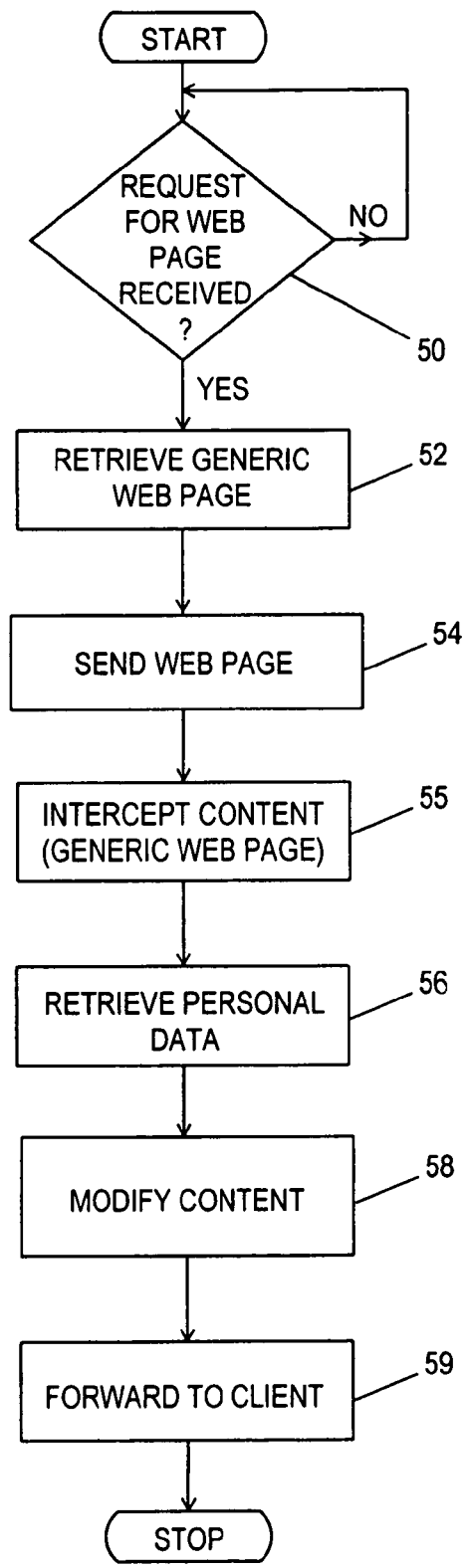
FIG. 6 is a flow diagram of still yet another method constituting a fourth embodiment of the present invention.

In a fourth embodiment of the invention (FIG. 6), the web server 10 awaits (step 50) a request for the web page, for example, through the HTTP GET command or through another mechanism, such as the HTTP POST command. When the HTTP GET command is received by the web server 10, the web server 10 retrieves (step 52) from the first storage device 12 the generic web page and transmits (step 54) the generic web page to the PC 2. The proxy server 20 intercepts (step 55) the generic web page and retrieves (step 56) from the second storage device 22 personal data corresponding to the attributes contained in the generic web page. The personal data is only retrieved upon identification of the subscription of GCHC to the ISP for the provision of the personal information in a like manner already described above in relation to the first and second embodiments. If GCHC has subscribed to the ISP for the provision of the personal information, the proxy server 20 can either, according to design choice, automatically select the set of attributes in accordance with the standing instruction. Subsequently, the proxy server 20 substitutes or modifies (step 58), the attributes disposed amongst the content of the generic web page with the personal information retrieved from the second storage device 22. Once modified, the generic web page is forwarded (step 59) to the PC 2 for presentation to the user by the web browser 60.

In another example of this embodiment, the personal information obtained from the second storage device 22 by the proxy server 20 includes the domicile, the preferred language and a preferred currency of the user. An appropriate generic web page, i.e. one of the number of generic web pages, is requested from the web server 10 using attributes of domicile and preferred language in accordance with either of the first or second embodiments. The appropriate generic web page comprises occurrences of an attribute relating to currency; the attribute relating to currency is a function for converting sums of money from a first currency to a second currency. The appropriate generic web page retrieved (step 52) from the first storage device 12 is sent (step 54) to the PC 2, but intercepted (step 55) by the proxy server 20. The proxy server 20 then identifies occurrences of the attributes relating to currency and retrieves (step 56) the personal information from the second storage device 22 corresponding to the attribute relating to currency. The proxy server 20 then executes the function using information relating to the preferred currency of the user, in this example Dutch Guilders. Hence, the proxy server 20 converts (step 58) any Pound Sterling prices quoted to Dutch Guilders and presents them in parentheses. The content of the appropriate generic web page is therefore personalised further to the benefit and convenience of the user. The appropriate generic web page (FIG. 11) in a personalised form is then transmitted (step 59) by the proxy server 20 to the PC 2 for presentation to the user by web browser 60.

Figure 7:
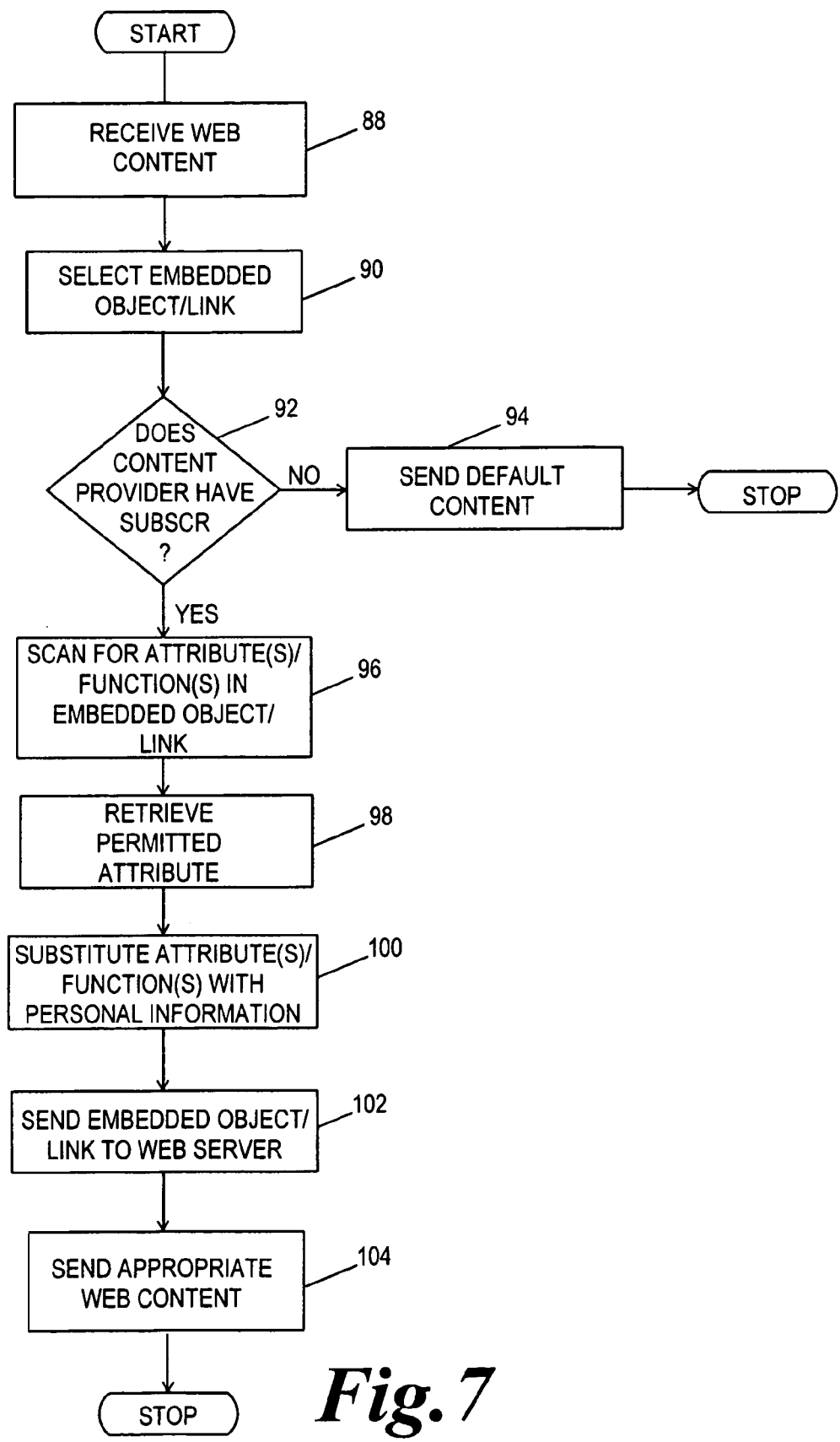
FIG. 7 is a flow diagram of still yet another method constituting a fifth embodiment of the present invention.
Figure 8:
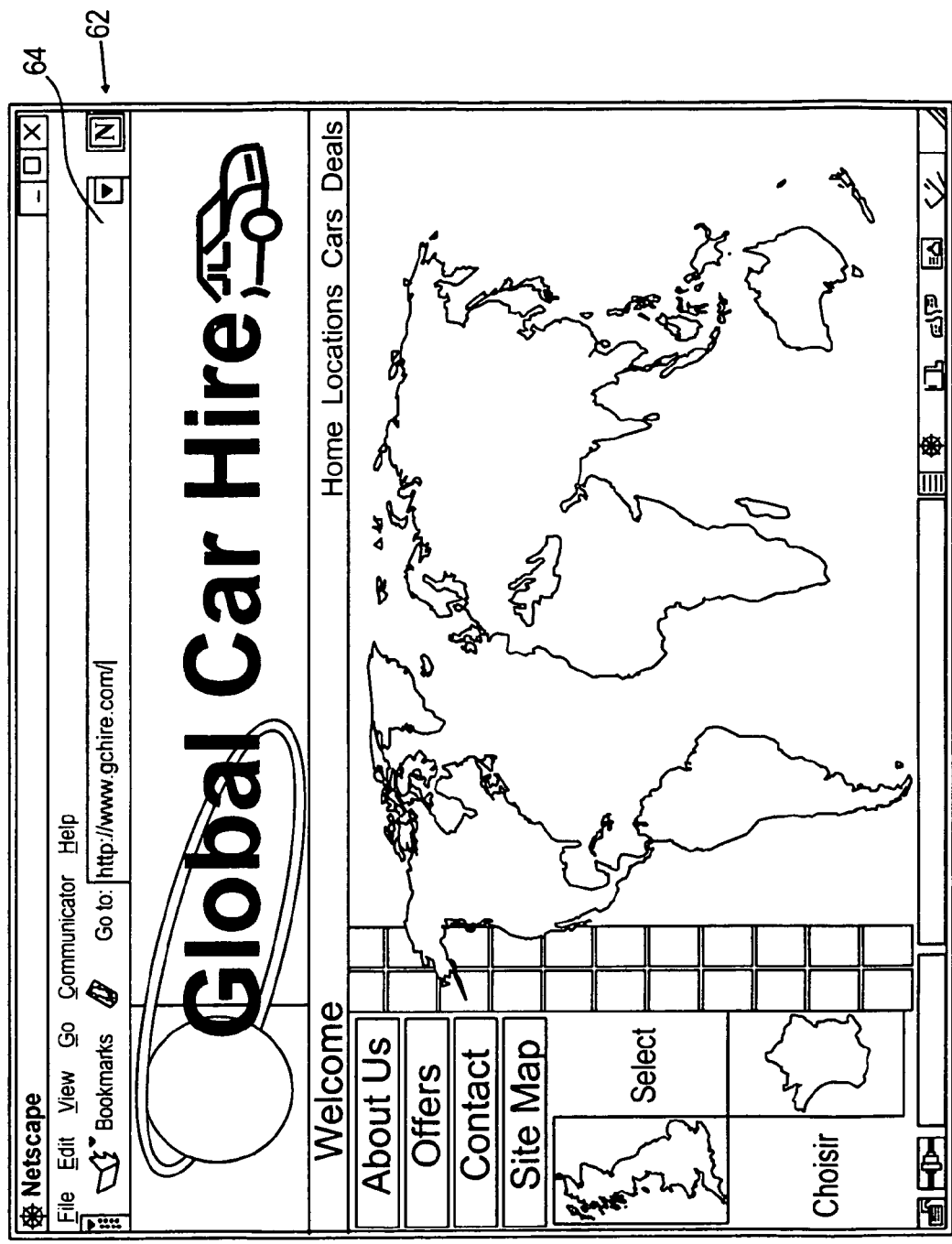
FIGS. 8 to 11 are examples of respective windows displayed by a web browser operating in accordance with the above embodiments of the present invention.
Figure 9:
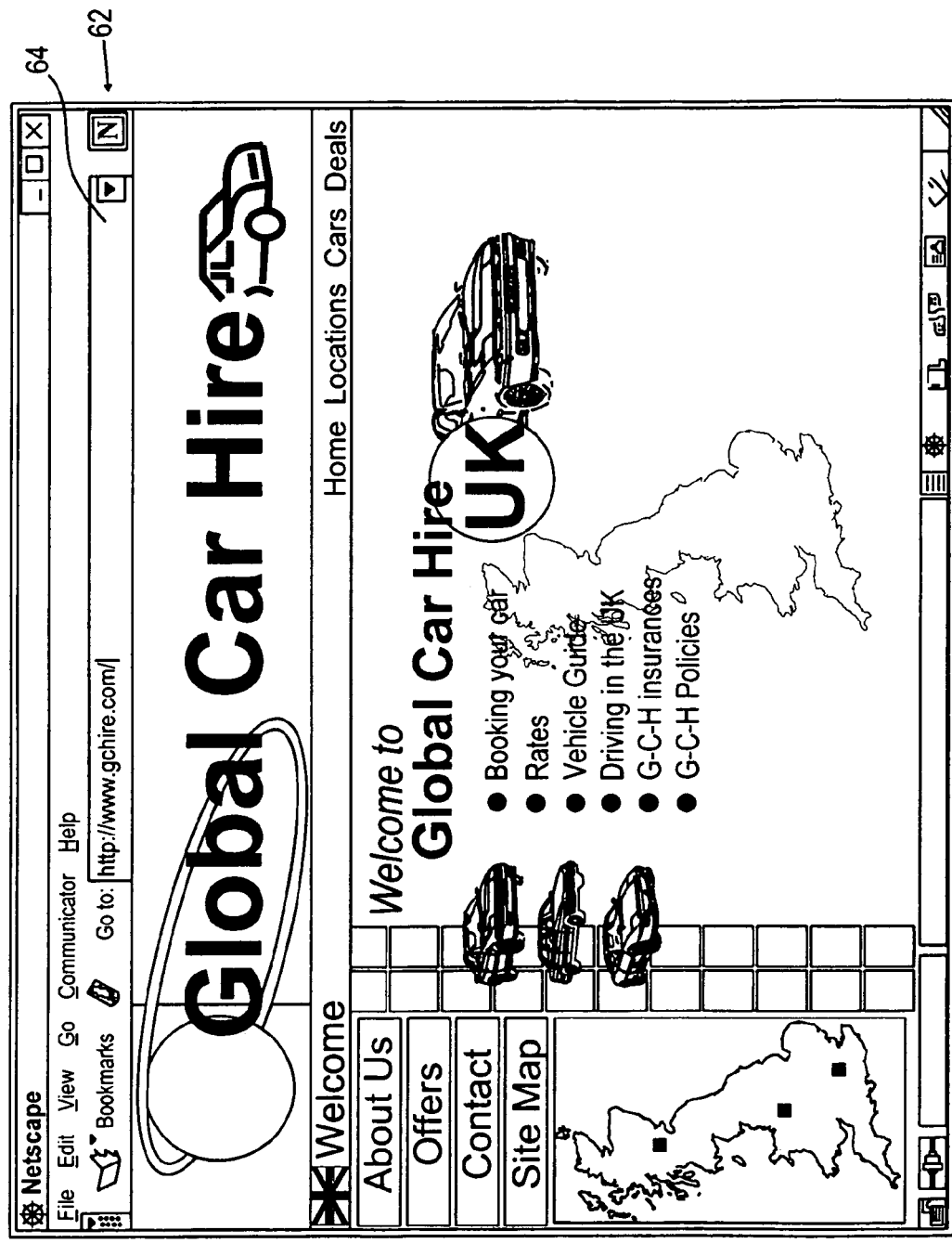
Figure 10:
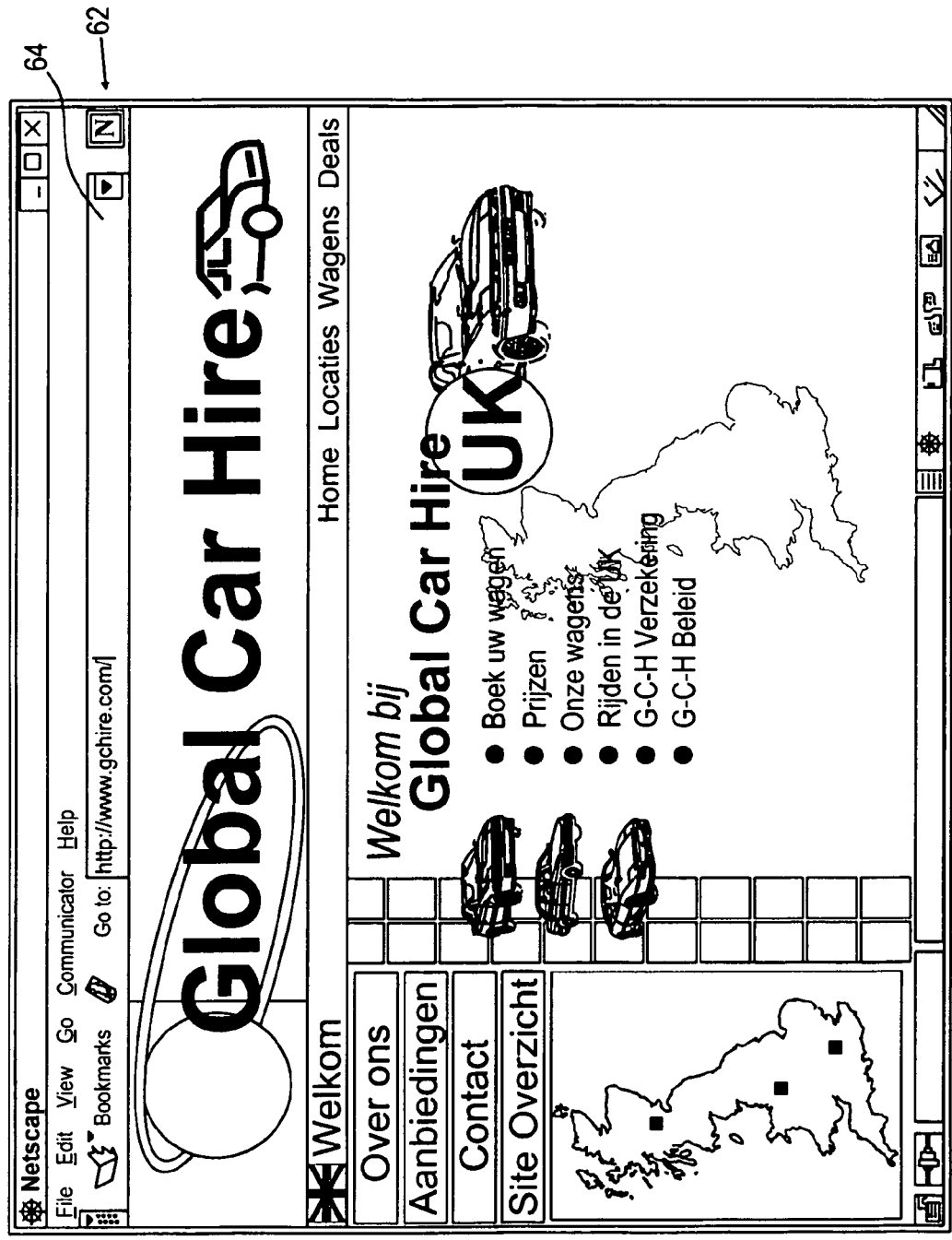
Figure 11:
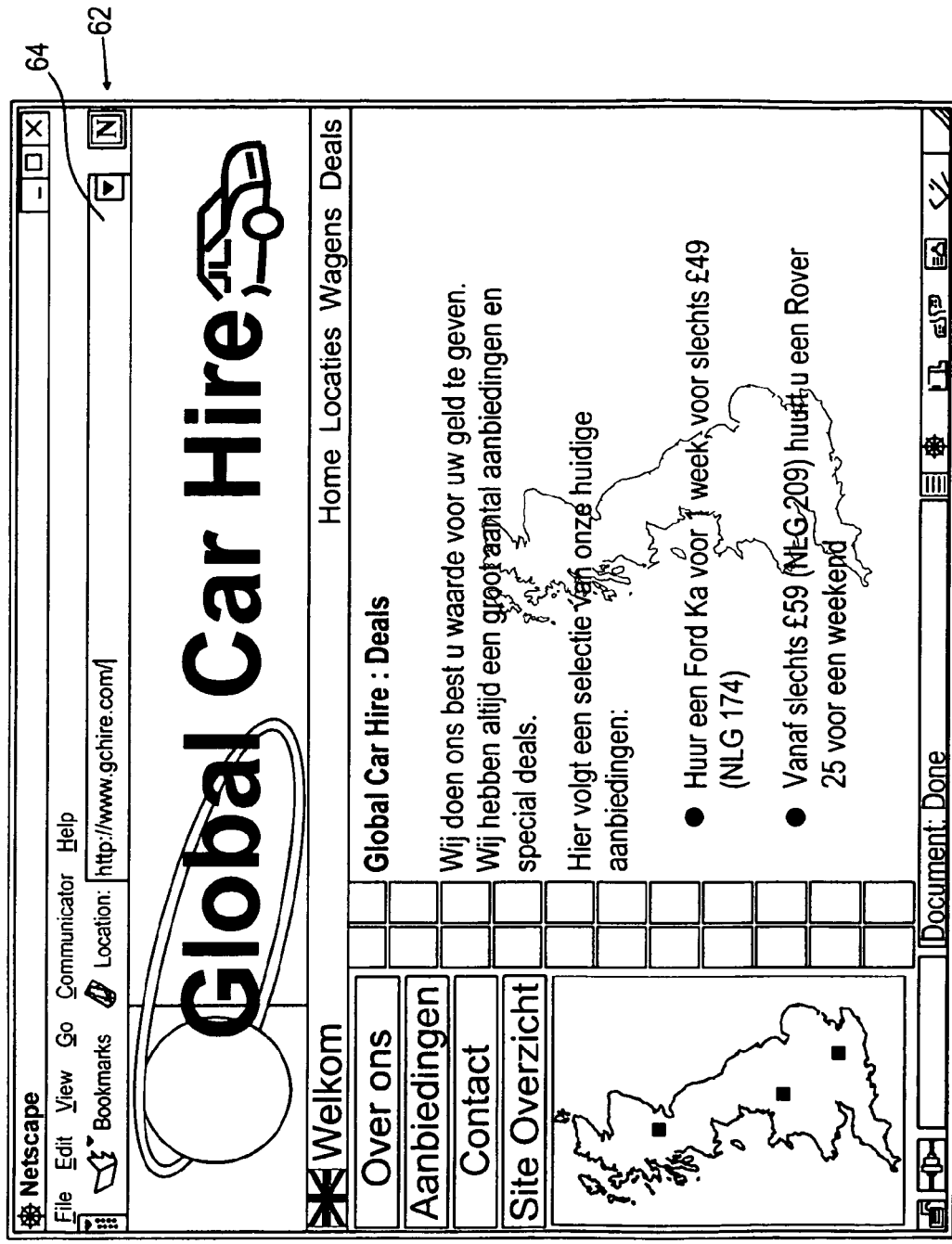

In a fifth embodiment of the invention (FIG. 7), the PC 2 receives (step 88) the web content (web page) from the web server 10 via the proxy server 20. In this embodiment, the web content comprises embedded objects and/or links. An example of the web content comprising embedded objects and links in HTML is as follows:
<html>
<head>
<title>Example page</title>
</head>

```
<body>
<IMG src="http://www.gchc.com/@CDC language/
   logo.gif">
Get this page in your preferred<A
HREF=http://www.qchc.com/@CDC
languaqe@index.html>language</A>
</body>
</html>
```

The web content, as in previous examples, is presented to the user by the web browser 60. The user is able, using the web browser 60 to select (step 90) one or more of the embedded objects and/or links according to any known technique in the art, for example by using an input device, such as a mouse. An embedded URL corresponding to the embedded link or object is then sent, for example using the HTTP GET command, to the web server 10. The proxy server 20 intercepts the HTTP GET command and then determines (step 92) whether the content provider possesses a subscription to the ISP for the provision of personal information about the user. If the content provider, in this example GCHC, does not possess the subscription, the proxy server 20 forwards the selected link or object to the web server 10 substantially unchanged. In response to the receipt of the substantially unchanged link or object selected, the web server 10 sends (step 94) the default web page to the PC 2 for presentation to the user by the web browser 60. In contrast, if the content provider possesses the subscription, the proxy server 20 scans (step 96) the selected link or object in the HTTP GET command and identifies attributes or functions embedded in the object or link. Upon identification of attributes or functions embedded in the object or link, the proxy server 20 retrieves (step 98) from the second storage device 22 personal information about the user corresponding to the one of the set of attributes that is permitted to be used for communications with the web server 10 in respect of the content provider. The one of the sets of attributes can be selected in accordance with any of the methods of previous examples described above. Although the above steps of scanning and identifying embedded objects or links (step 96), and retrieval (step 98) of personal information have been executed in the order described above, the order of the above steps can be swapped. The proxy server 20 then substitutes (step 100) the attributes identified or executes (step 100) the functions identified with or using the personal information retrieved to form a modified HTTP GET command. The modified HTTP GET command is then sent (step 102) to the web server 10 by the proxy server 20, and the web server 10 responds by sending (step 104) the personalised web content (web page) corresponding to the personal information sent in the modified HTTP GET command to the PC 2 for presentation to the user by the web browser 60.

It should be appreciated that any of the above embodiments can be used in combination with each other, where appropriately compatible. If used alone, the fourth embodiment possesses an additional advantage over the first and second embodiments in that the personal data is not readily revealed to the web server 10.

In one or more of the above embodiments, the rule set can be configured so as to ensure that the proxy server 20 only substitutes attributes or executes functions in a specified communication direction, i.e. an uplink or a downlink direction.

Although the above examples have been described in the context of the HTTP and HTML, it should be appreciated that the present invention works equally well with other protocols or content providing languages, for example, a Real Time Streaming Protocol (RTSP) and/or a Synchronised Multimedia Integration Language (SMIL).

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

The invention claimed is:

1. A web content personalisation system for a communications network comprising:
   a client equipment unit capable of communicating a request message from a user to a content providing server to request content from said content providing server;
   a data manipulation server disposed in-line between the client equipment unit and the content providing server, the data manipulation server being remote from the client equipment unit, the data manipulation server being coupled to a data store arranged to store personal data relating to a user of the client equipment unit; wherein
   the data manipulation server is adapted to intercept said request message for obtaining the content, retrieve personal data relating to the user from the data store and to use the retrieved personal data to modify the request message prior to forwarding said request message to the content providing server; and
   the content providing server is adapted to store a number of versions of said content relating to attribute variables/parameters of the personal data relating to the user, to retrieve, in response to receiving the request message, an appropriate version of the content in dependence on the personal data of the user used to modify the request message, and to send said retrieved version of the content to the client equipment unit.

2. A system as claimed in claim 1, wherein the request message is a Hyper Text Transfer Protocol (HTTP) request message.

3. A system as claimed in claim 1, wherein the personal data relating to the user is static data.

4. A system as claimed in claim 3, wherein the static data is obtained from the user.

5. A system as claimed in claim 3, wherein the static data is obtained from a content provider associated with the content.

6. A system as claimed in claim 1, wherein the personal data relating to the user is dynamic data.

7. A system as claimed in claim 6, wherein the dynamic data is obtained from an access or service provider associated with supporting communications between the client equipment unit and the content providing server.

8. A system as claimed in claim 1, wherein the data manipulation server is a proxy server.

9. A content providing server apparatus comprising:
   a transceiver and a processor coupled to a data store arranged to store content data, the transceiver and the processor being arranged to retrieve content data from the data store and transmit the content data to a client equipment unit in response to the client equipment unit transmitting to the content providing server a request message for obtaining the content; wherein the content providing server apparatus is adapted to receive a request message from the client equipment unit wherein said request message has been modified with personal data relating to a user of the client equipment unit, to store a number of versions of said content relating to attribute variables/parameters of the personal data relating to the user, to retrieve, in response to receiving the request message, an appropriate version of the content in dependence on the personal data of the user used to modify the request message, and to send said retrieved version of the content to the client equipment unit.

10. An apparatus as claimed in claim 9, wherein the content data is Hyper Text Mark-up Language (HTML) data.

11. An apparatus as claimed in claim 9, wherein the personal data relating to the user is static data.

12. An apparatus as claimed in claim 11, wherein the static data is obtained from the user.

13. An apparatus as claimed in claim 11, wherein the static data is obtained from a content provider associated with the content.

14. An apparatus as claimed in claim 9, wherein the personal data relating to the user is dynamic data.

15. An apparatus as claimed in claim 14, wherein the dynamic data is obtained from an access or service provider associated with supporting communications between the client equipment unit and the content providing server.

16. A method of personalising content communicated to a client equipment unit by a content providing server, the method comprising the steps of:

intercepting at a data manipulation server remote from the client equipment unit and disposed in-line between the content providing server and the client equipment unit, a request message for obtaining the content, the request message being transmitted from the client equipment unit and addressed to the content providing server;

in response to the interception, retrieving from a data store personal data relating to a user of the client equipment unit; and modifying the request message prior to forwarding said request message to the content providing server; and storing at the content providing server a number of versions of said content relating to attribute variables/parameters of the personal data relating to the user, retrieving, in response to receiving the request message, an appropriate version of the content in dependence on the personal data of the user used to modify the request message, and sending said retrieved version of the content to the client equipment unit.

17. A method as claimed in claim 16, wherein the request message is a Hyper Text Transfer Protocol (HTTP) request message.

18. A method as claimed in claim 16, wherein the personal data relating to the user is static data.

19. A method as claimed in claim 18, further comprising the step of:
obtaining the static data from the user.

20. A method as claimed in claim 18, further comprising the step of:
obtaining the static data is from a content provider associated with the content.

21. A method as claimed in claim 16, wherein the personal data relating to the user is dynamic data.

22. A method as claimed in claim 21, further comprising the step of:

obtaining the dynamic data from an access or service provider associated with supporting communications between the client equipment unit and the content providing server.

23. A programmed computer for personalising content communicated to a client equipment unit from a content providing server, the computer comprising:

a memory having at least one region for storing computer executable program code, and a processor for executing the program code stored in the memory, wherein the program code comprises:

code to intercept at a data manipulation server, disposed in-line between the client equipment unit and content providing server and remote from the client equipment unit, a request message for obtaining the content, the request message being transmitted from the client equipment unit and addressed to the content providing server;

code to retrieve personal data relating to a user of the client equipment unit in response to the interception;

code to modify the request message prior to forwarding said request message to the content providing server; and code for storing at the content providing server a number of versions of said content relating to attribute variables/parameters of the personal data relating to the user, retrieving, in response to receiving the request message, an appropriate version of the content in dependence on the personal data of the user used to modify the request message, and sending said retrieved version of the content to the client equipment unit.

24. A content personalisation system according to claim 1, wherein the data manipulation server is arranged to modify the request message in dependence on a selected subset of the personal data relating to a user stored in the data store.

25. A content personalisation system according to claim 24, wherein the data manipulation server is arranged to request the user of the client equipment unit to select the subset in response to intercepting the request message.

26. A content personalisation system according to claim 24, wherein the data manipulation server is arranged to determine the subset in dependence on at least one rule of a user defined rule set, the at least one rule applying to the content providing server.

27. A content personalisation system according to claim 1, wherein the data manipulation server is arranged selectively to modify the request message in dependence on the data manipulation server detecting that the content providing server has a subscription with the data manipulation server.

28. A content personalisation system according to claim 1, wherein the data manipulation server is operated by an access or service provider associated with supporting communications between the client equipment unit and the content providing server.

29. A method of personalising content according to claim 16, wherein the retrieved personal data relating to the user is a selected subset of personal data relating to the user stored in the data store.

30. A method of personalising content according to claim 29, comprising the step of:
requesting the user of the client equipment unit to select the subset in response to the interception.

31. A method of personalising content according to claim 29, comprising the step of:
determining the subset in dependence on at least one rule of a user defined rule set, the at least one rule applying to the content providing server.

32. A method of personalising content according to claim 16, comprising the step of:
   selectively modifying the request message in dependence on detecting that the content providing server has a subscription.

33. A method of personalising content according to claim 16, wherein the method is performed by an access or service provider associated with supporting communications between the client equipment unit and the content providing server.

34. A content personalisation system for a communications network comprising:
   a client equipment unit capable of communicating with a content providing server for providing content;
   a data manipulation server disposed in-line between the client equipment unit and the content providing server and remote from the client equipment unit, the data manipulation server being coupled to a data store arranged to store personal data relating to a user of the client equipment unit; wherein
   the data manipulation server is adapted to intercept said request message for obtaining the content, to retrieve personal data relating to the user from the data store and to use the retrieved personal data to modify the request message prior to forwarding said request message to the content providing server; and
   the content providing server is adapted to store a number of versions of said content relating to attribute variables/parameters of the personal data relating to the user, to retrieve, in response to receiving the request message, an appropriate version of the content in dependence on the personal data of the user used to modify the request message, and to send said retrieved version of the content to the client equipment unit.

35. A method of personalising content communicated to a client equipment unit by a content providing server, the method comprising the steps of:
   intercepting at a data manipulation server, disposed in-line between the client equipment unit and content providing server and remote from the client equipment unit, a request message being transmitted from the client equipment unit to the content providing server for obtaining the content;
   in response to the interception, retrieving personal data relating to a user of the client equipment unit;
   modifying the request message in dependence on the retrieved personal data relating to the user;
   forwarding the modified request message to the content providing server; and
   storing at the content providing server a number of versions of said content relating to attribute variables/parameters of the personal data relating to the user, retrieving, in response to receiving the request message, an appropriate version of the content in dependence on the personal data of the user used to modify the request message, and sending said retrieved version of the content to the client equipment unit.

* * * * *